(12) United States Patent
Tanaka

(10) Patent No.: US 11,183,856 B2
(45) Date of Patent: Nov. 23, 2021

(54) BATTERY SYSTEM, ELECTRICALLY-POWERED VEHICLE AND CONTROL METHOD FOR ELECTRICALLY-POWERED VEHICLE

(71) Applicant: TOYOTA JIDOSHA KABUSHIKI KAISHA, Toyota (JP)

(72) Inventor: Hiromasa Tanaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 16/697,302

(22) Filed: Nov. 27, 2019

(65) Prior Publication Data

US 2020/0195020 A1 Jun. 18, 2020

(30) Foreign Application Priority Data

Dec. 17, 2018 (JP) .............................. JP2018-235383

(51) Int. Cl.
*H02J 7/00* (2006.01)
*B60L 58/20* (2019.01)
*H02J 7/34* (2006.01)

(52) U.S. Cl.
CPC ............ *H02J 7/0014* (2013.01); *B60L 58/20* (2019.02); *H02J 7/342* (2020.01)

(58) Field of Classification Search
CPC ................................ H02J 7/0014; B60L 58/20
USPC ........................................................ 320/104
See application file for complete search history.

(56) References Cited

U.S. PATENT DOCUMENTS 5,710,504 A * 1/1998 Pascual et al. ....... H02J 7/0018
180/65.8
10,164,442 B2 * 12/2018 Kaita et al. ........... H02J 7/0029

FOREIGN PATENT DOCUMENTS

JP 2010-141957 A 6/2010

OTHER PUBLICATIONS

Hoque et al., "Battery charge equalization controller in electric vehicle applications: A review", Dec. 2016, Elsevier Ltd., Renewable and Substanable Energy Reviews 75 (2017) pp. 1363-1385.*

* cited by examiner

*Primary Examiner* — Sun J Lin
(74) *Attorney, Agent, or Firm* — Sughrue Mion, PLLC

(57) ABSTRACT

A battery system includes a plurality of converters wherein each converter converts an electric power between a corresponding block of a plurality of blocks and an auxiliary battery. A first equalization control is a control for, when a vehicle is in a ReadyON state, operating a converter corresponding to a lower-voltage block, of at least one pair of blocks of the plurality of blocks having voltage variations exceeding a threshold value, such that the lower-voltage block is charged with an electric power supplied from the auxiliary battery. A second equalization control is a control for, when the vehicle is in a ReadyOFF state, operating a converter corresponding to a higher-voltage block, of at least one pair of blocks of the plurality of blocks having the voltage variations exceeding another threshold value, such that the auxiliary battery is charged with an electric power supplied from the higher-voltage block.

3 Claims, 6 Drawing Sheets

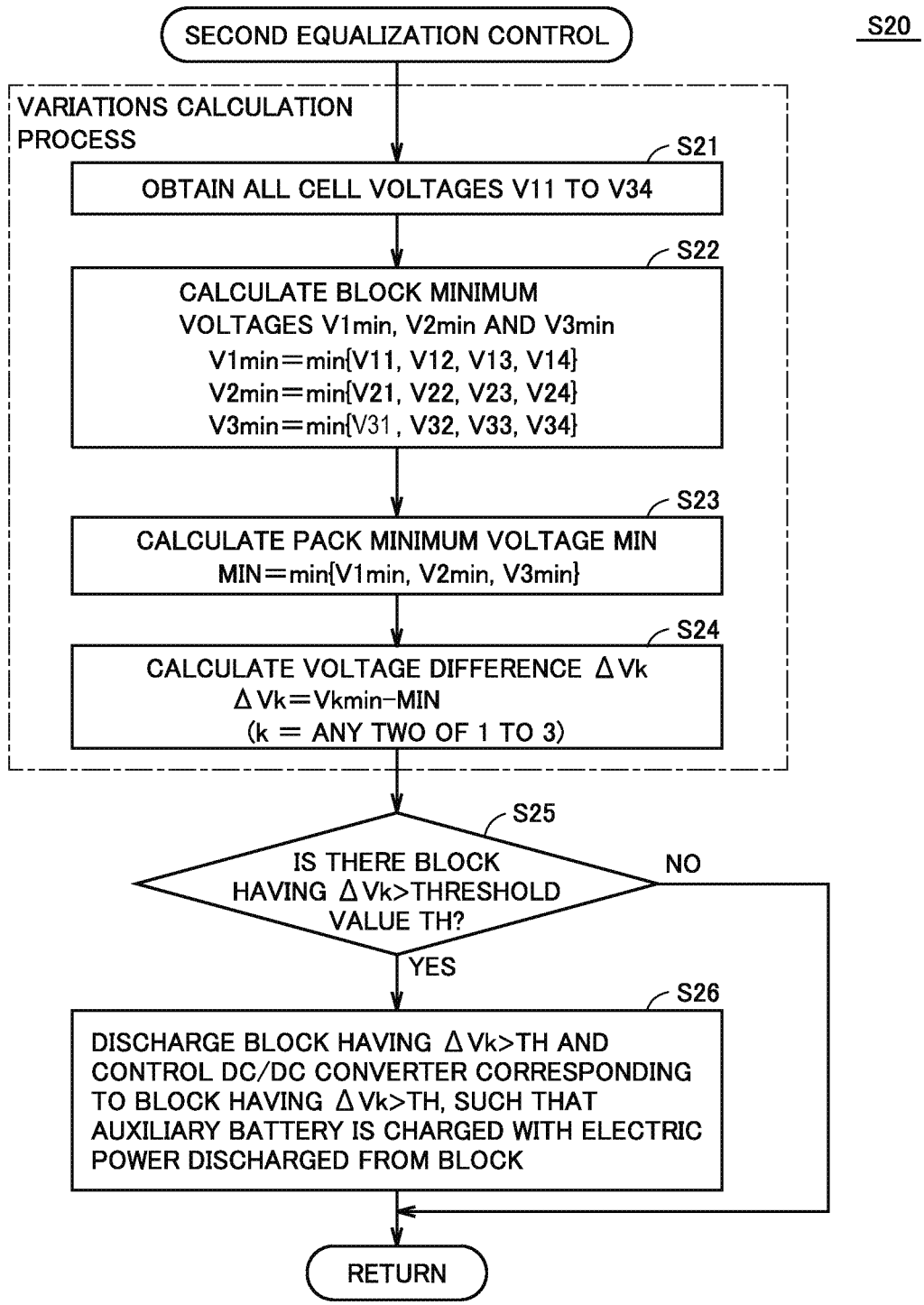

BATTERY SYSTEM, ELECTRICALLY-POWERED VEHICLE AND CONTROL METHOD FOR ELECTRICALLY-POWERED VEHICLE

This nonprovisional application is based on Japanese Patent Application No. 2018-235383 filed on Dec. 17, 2018 with the Japan Patent Office, the entire contents of which are hereby incorporated by reference.

BACKGROUND

Field

The present disclosure relates to a battery system, an electrically-powered vehicle and a control method for the electrically-powered vehicle, and more particularly, to the charging and discharging technique in a battery system mounted on an electrically-powered vehicle including an auxiliary device and a motor serving as a driving source.

Description of the Background Art

In recent years, electrically-powered vehicles (hybrid vehicles or electric vehicles) on which assembled batteries for supplying electric power to motors serving as driving sources are mounted have been becoming popular. Some of the assembled batteries mounted on these electrically-powered vehicles have a configuration described below. Specifically, the assembled battery includes a plurality of blocks connected in series. Each of the plurality of blocks includes a plurality of cells connected in series.

It is known that voltage variations may occur among the plurality of blocks or among the plurality of cells in each block in the above-described configuration. Therefore, it is proposed to provide an equalization circuit for reducing such voltage variations and execute equalization control. For example, Japanese Patent Laying-Open No. 2010-141957 discloses a device configuration including both an in-block equalization circuit that reduces voltage variations in a block and an inter-block equalization circuit that reduces voltage variations between blocks.

SUMMARY

In the equalization circuits disclosed in Japanese Patent Laying-Open No. 2010-141957, for example, electric power discharged from an assembled battery during equalization control is converted to heat by a resistor. The heat cannot be particularly used and is simply discarded. Therefore, when the electrically-powered vehicle is a hybrid vehicle, an adverse effect on the equalization control, such as reduction in fuel economy, may occur. Therefore, it is desirable to effectively utilize the electric power in the equalization control.

The inventor of the present disclosure has focused attention on the fact that the following problem may occur. Generally, an electrically-powered vehicle can take a state in which electric power is supplied from an assembled battery to a motor and the vehicle can travel (ReadyON state), and a state in which electric power supply from the assembled battery to the motor is blocked and the vehicle cannot travel (ReadyOFF state). It is also assumed that the vehicle is in a traveling-impossible state for a long period of time, such as the vehicle being left unattended for several months. During this period, self-discharge of an auxiliary battery progresses gradually. Therefore, electric power stored in the auxiliary battery can possibly decrease excessively and the function of the auxiliary device cannot possibly be maintained.

The present disclosure has been made to solve the above-described problem and an object of the present disclosure is to make it possible to effectively utilize electric power in equalization control and supply electric power required for an auxiliary device for a long period of time.

(1) A battery system according to an aspect of the present disclosure is mountable on an electrically-powered vehicle including an auxiliary device and a motor serving as a driving source. The battery system includes: an auxiliary battery that supplies electric power to the auxiliary device; and an assembled battery that supplies electric power to the motor. The assembled battery includes a plurality of blocks connected in series. Each of the plurality of blocks includes a plurality of cells connected in series. The battery system further includes: a plurality of converters that each converts electric power between a corresponding one of the plurality of blocks and the auxiliary battery, the plurality of converters being provided to correspond to the plurality of blocks; and a controller that executes first equalization control when the electrically-powered vehicle is in a traveling-possible state, and executes second equalization control when the electrically-powered vehicle is in a traveling-impossible state.

The first equalization control is control for, when voltage variations among the plurality of blocks exceed a first threshold value, operating a converter corresponding to a lower-voltage block, of at least one pair of blocks having the voltage variations exceeding the first threshold value, such that the lower-voltage block is charged with electric power supplied from the auxiliary battery. The second equalization control is control for, when the voltage variations among the plurality of blocks exceed a second threshold value, operating a converter corresponding to a higher-voltage block, of at least one pair of blocks having the voltage variations exceeding the second threshold value, such that the auxiliary battery is charged with electric power supplied from the higher-voltage block.

(2) An electrically-powered vehicle according to another aspect of the present disclosure includes: the above-described battery system; the motor; and the auxiliary device.

In the configurations described in (1) and (2) above, the first equalization control is executed when the electrically-powered vehicle is in the traveling-possible state. In the first equalization control, when the voltage variations among the plurality of blocks exceed the threshold value, the lower-voltage block of at least one pair of blocks having the voltage variations exceeding the threshold value is charged with the electric power supplied from the auxiliary battery. As a result, a voltage of the block rises, and thus, voltage equalization is achieved. In addition, by using the converter instead of a resistor, generation of heat can be reduced and the electric power in the equalization control can be effectively utilized.

In contrast, the second equalization control is executed when the electrically-powered vehicle is in the traveling-impossible state. In the second equalization control, when the voltage variations among the plurality of blocks exceed the other threshold value, the auxiliary battery is charged with the electric power supplied from the lower-voltage block of at least one pair of blocks having the voltage variations exceeding the threshold value. As a result, a voltage of the block decreases, and thus, voltage equalization is achieved. Similarly to the first equalization control, by using the converter, generation of heat can be reduced and the electric power can be effectively utilized. Furthermore, since the auxiliary battery is charged, the electric power required for the auxiliary device can be supplied for a long period of time.

(3) In a control method for an electrically-powered vehicle according to still another aspect of the present disclosure, the electrically-powered vehicle includes an assembled battery that supplies electric power to a motor serving as a driving source, and an auxiliary battery that supplies electric power to an auxiliary device. The assembled battery includes a plurality of blocks connected in series. Each of the plurality of blocks includes a plurality of cells connected in series. The electrically-powered vehicle further includes a plurality of converters that each converts electric power between a corresponding one of the plurality of blocks and the auxiliary battery, the plurality of converters being provided to correspond to the plurality of blocks. The control method for the electrically-powered vehicle includes: executing first equalization control when the electrically-powered vehicle is in a traveling-possible state; and executing second equalization control when the electrically-powered vehicle is in a traveling-impossible state.

The first equalization control is control for, when voltage variations among the plurality of blocks exceed a first threshold value, operating a converter corresponding to a lower-voltage block, of at least one pair of blocks having the voltage variations exceeding the first threshold value, such that the lower-voltage block is charged with electric power supplied from the auxiliary battery. The second equalization control is control for, when the voltage variations among the plurality of blocks exceed a second threshold value, operating a converter corresponding to a higher-voltage block, of at least one pair of blocks having the voltage variations exceeding the second threshold value, such that the auxiliary battery is charged with electric power supplied from the higher-voltage block.

According to the method described in (3) above, similarly to the configuration described in (1) above, the electric power in the equalization control can be effectively utilized and the electric power required for the auxiliary device can be supplied for a long period of time.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is a flowchart showing the second equalization control.

DESCRIPTION OF THE PREFERRED EMBODIMENTS

Figure 1:
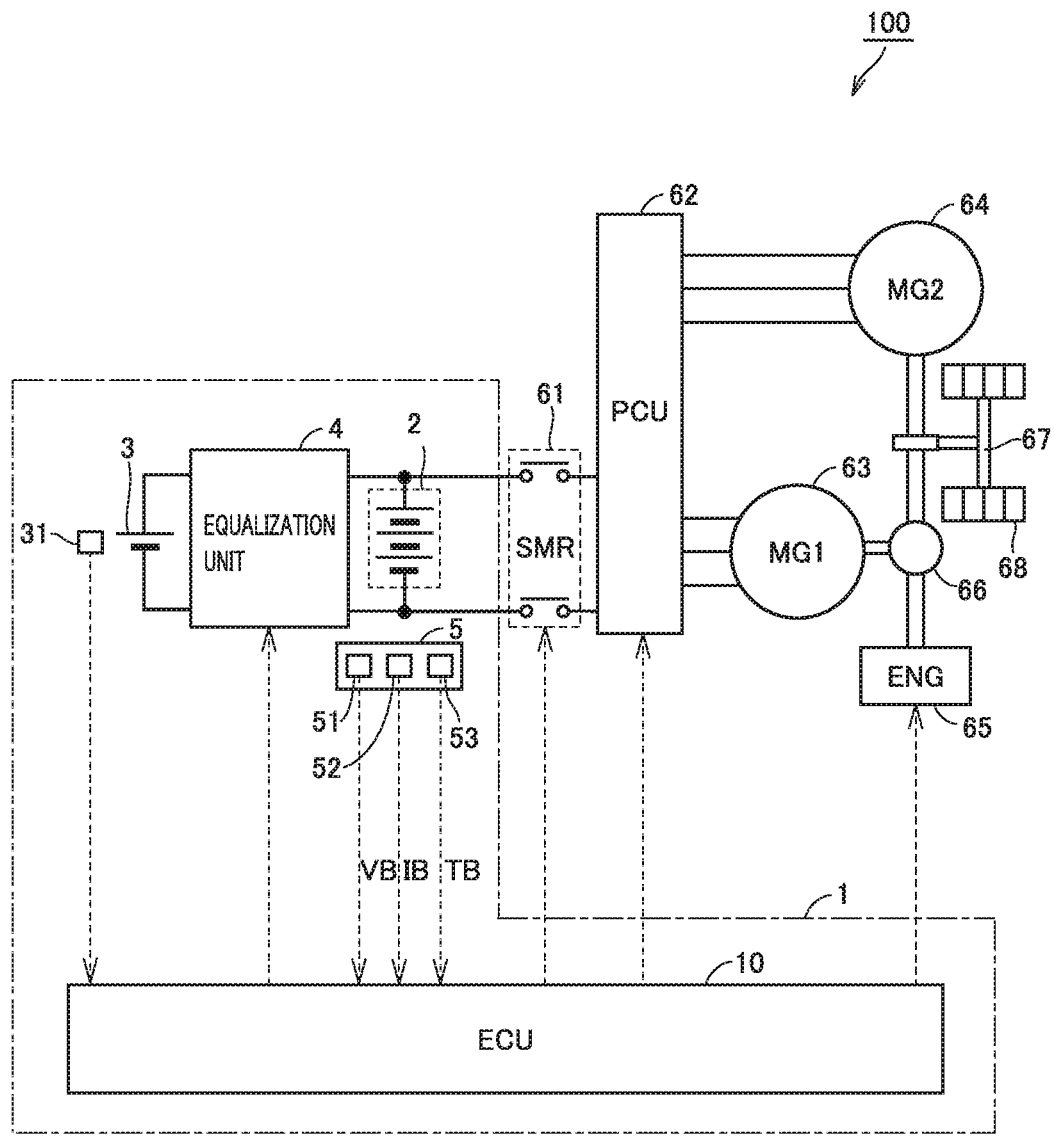
FIG. 1 is a block diagram schematically showing an overall configuration of a vehicle according to the present embodiment.

An embodiment of the present disclosure will be described in detail hereinafter with reference to the drawings, in which the same or corresponding portions are denoted by the same reference characters and description thereof will not be repeated.

Embodiment

<Configuration of Vehicle>

FIG. 1 is a block diagram schematically showing an overall configuration of a vehicle according to the present embodiment. Referring to FIG. 1, a vehicle 100 is, for example, a hybrid vehicle and includes a battery system 1. Battery system 1 includes a battery pack 2, an auxiliary battery 3, an equalization unit 4, a monitoring unit 5, and an electronic control unit (ECU) 10. In addition to battery system 1, vehicle 100 further includes a system main relay (SMR) 61, a power control unit (PCU) 62, motor generators 63 and 64, an engine 65, a power split device 66, a drive shaft 67, and a driving wheel 68.

Battery pack 2 stores electric power for driving motor generators 63 and 64, and supplies the electric power to motor generators 63 and 64 through PCU 62. An output voltage of battery pack 2 is, for example, approximately several hundred volts. In addition, battery pack 2 receives generated electric power through PCU 62 during power generation by motor generators 63 and 64, and is charged with the generated electric power.

Figure 2:
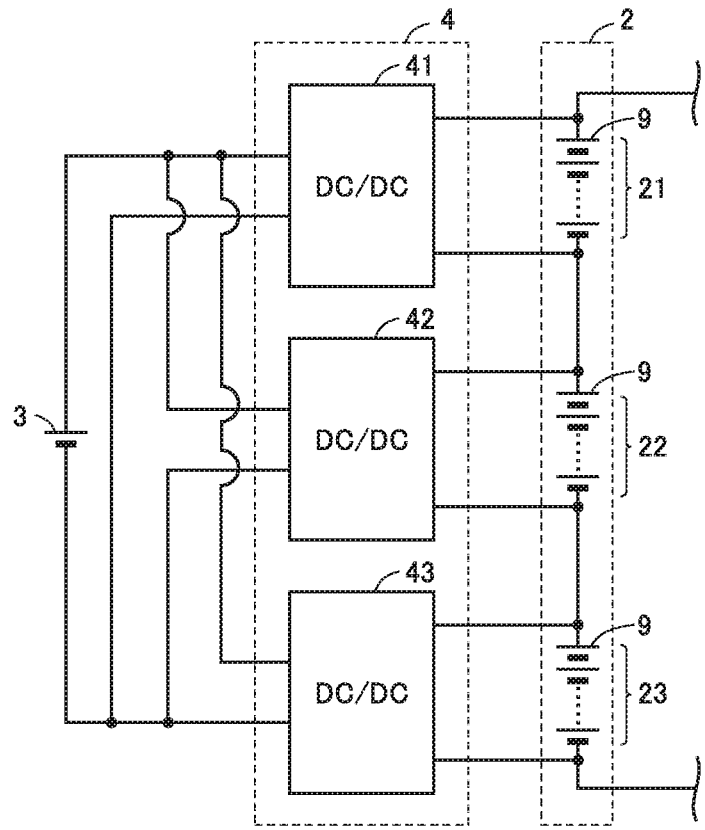
FIG. 2 is a block diagram for illustrating configurations of an assembled battery, an auxiliary battery and an equalization unit in more detail.

Battery pack 2 includes an assembled battery including a plurality of cells 9 (see FIG. 2). In the present embodiment, each of the plurality of cells 9 is a lithium ion secondary battery. However, the type of the cells is not particularly limited and may be, for example, a nickel-metal hydride battery.

Auxiliary battery 3 is a secondary battery for operating various auxiliary devices (not shown) included in vehicle 100. Auxiliary battery 3 is, for example, a lead storage battery. An output voltage of auxiliary battery 3 is, for example, approximately 12 V.

Equalization unit 4 is electrically connected between battery pack 2 and auxiliary battery 3. Details of configurations of battery pack 2, auxiliary battery 3 and equalization unit 4 will be described with reference to FIGS. 2 and 3.

Monitoring unit 5 includes a voltage sensor 51, a current sensor 52 and a temperature sensor 53. Voltage sensor 51 comprehensively represents a plurality of sensors that are not shown, and detects a voltage of each cell 9. Current sensor 52 detects a current IB input to and output from battery pack 2. Temperature sensor 53 detects a temperature of battery pack 2. Each sensor outputs a result of detection to ECU 10. Auxiliary battery 3 is provided with a voltage sensor 31. Voltage sensor 31 detects a voltage of auxiliary battery 3 and outputs a result of detection to ECU 10.

SMR 61 is electrically connected to a power line connecting PCU 62 and battery pack 2. SMR 61 switches between supply and cut-off of electric power flowing between PCU 62 and battery pack 2, in accordance with a control signal provided from ECU 10.

PCU 62 performs bidirectional power conversion between battery pack 2 and motor generators 63 and 64, in accordance with a control signal provided from ECU 10.

PCU 62 separately controls states of motor generators 63 and 64. For example, PCU 62 can bring motor generator 64 into a power running state while bringing motor generator 63 into a regenerative state (power generation state). PCU 62 includes, for example, two inverters provided to correspond to motor generators 63 and 64, and a converter that boosts a DC voltage supplied to each inverter to be equal to or higher than the output voltage of battery pack 2 (all are not shown).

Each of motor generators 63 and 64 is an AC rotating electric machine, and is, for example, a three-phase AC synchronous motor in which a permanent magnet is embedded in a rotor. Motor generator 63 is mainly used as a generator driven by engine 65 via power split device 66. The electric power generated by motor generator 63 is supplied to motor generator 64 or battery pack 2 through PCU 62. Motor generator 63 can also perform cranking of engine 65.

Motor generator 64 mainly operates as a motor and drives driving wheel 68. Motor generator 64 is driven by at least one of the electric power supplied from battery pack 2 and the electric power generated by motor generator 63, and the driving force of motor generator 64 is transmitted to drive shaft 67. In contrast, during braking of the vehicle and during reduction in acceleration on a downward slope, motor generator 64 operates as a generator and performs regenerative power generation. The electric power generated by motor generator 64 is supplied to battery pack 2 through PCU 62.

Engine 65 is an internal combustion engine that outputs motive power by converting combustion energy generated when burning an air-fuel mixture into kinetic energy for movable members such as a piston and a rotor.

Power split device 66 includes, for example, a planetary gear mechanism (not shown) having three rotation shafts of a sun gear, a carrier and a ring gear. Power split device 66 divides the motive power output from engine 65 into motive power for driving motor generator 63 and motive power for driving driving wheel 68.

Although not shown, ECU 10 includes a CPU (Central Processing Unit), a memory, an input/output port and the like. ECU 10 controls various devices such that vehicle 100 takes a desired operation state, based on a signal provided from each sensor and device, and a map and a program stored in the memory. In the present embodiment, examples of main control executed by ECU 10 include equalization control for reducing voltage variations among blocks included in battery pack 2. This control will be described in detail below.

FIG. 1 shows, by way of example, the configuration in which vehicle 100 is a hybrid vehicle. However, vehicle 100 is not particularly limited as long as it is a vehicle on which an assembled battery for driving is mounted. Vehicle 100 may be a plug-in hybrid vehicle, or may be an electric vehicle, or may be a fuel cell vehicle.

<Configuration of Battery System>

FIG. 2 is a block diagram for illustrating the configurations of battery pack 2, auxiliary battery 3 and equalization unit 4 in more detail. Referring to FIG. 2, battery pack 2 includes blocks 21 to 23 connected in series. Description will be given of an example in which three blocks are included in battery pack 2. However, the number of blocks is arbitrary as long as two or more blocks are included in battery pack 2.

Each of blocks 21 to 23 includes a plurality of cells 9 connected in series. The number of cells is not particularly limited, either, as long as two or more cells are included in each block. In addition, the number of cells included in all blocks 21 to 23 needs not to be the same.

Equalization unit 4 includes DC/DC converters 41 to 43. DC/DC converters 41 to 43 are provided to correspond to blocks 21 to 23, respectively. Specifically, DC/DC converter 41 is electrically connected between block 21 and auxiliary battery 3. DC/DC converter 42 is electrically connected between block 22 and auxiliary battery 3. DC/DC converter 43 is electrically connected between block 23 and auxiliary battery 3.

Each of DC/DC converters 41 to 43 receives and transmits electric power between a corresponding one of blocks 21 to 23 and auxiliary battery 3. Since configurations of DC/DC converters 41 to 43 are common, the configuration of DC/DC converter 41 will be representatively described below.

Figure 3:
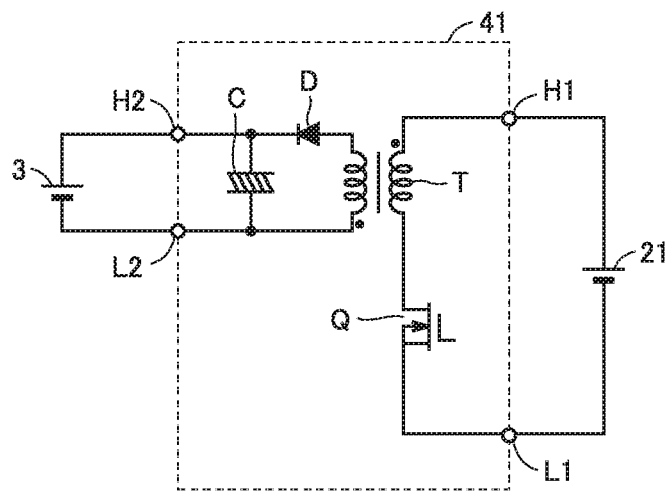
FIG. 3 is a circuit diagram showing an example configuration of the equalization unit.

FIG. 3 is a circuit diagram showing an example configuration of DC/DC converter 41. Referring to FIG. 3, DC/DC converter 41 has input nodes H1 and L1, and output nodes H2 and L2. Block 21 is electrically connected to input nodes H1 and L1, and auxiliary battery 3 is electrically connected to output nodes H2 and L2. DC/DC converter 41 receives DC power between input nodes H1 and L1, converts a voltage of the DC power to a different voltage, and outputs the DC power subjected to voltage conversion to between output nodes H2 and L2.

DC/DC converter 41 is preferably an insulated converter. FIG. 3 shows a flyback-type converter as an example of the insulated converter. DC/DC converter 41 includes a transformer T, a transistor Q, a diode D, and a capacitor C.

A primary-side winding of transformer T and transistor Q are connected in series between input nodes H1 and L1. A secondary-side winding of transformer T and diode D are connected in series between output nodes H2 and L2. Capacitor C is connected between output nodes H2 and L2.

Transistor Q is a switching element and is, for example, an N-channel MOS (Metal-Oxide Semiconductor) transistor. An alternating current generated by switching of transistor Q is transmitted to the secondary side of transformer T. At this time, diode D blocks a current generated on the secondary side of transformer T when transistor Q is on. Capacitor C smooths an output voltage on the secondary side of transformer T.

The example in which the DC/DC converter is provided for each of blocks 21 to 23 has been described with reference to FIG. 2. However, battery pack 2 is configured such that all cells 9 are connected in series, and thus, the DC/DC converter can be provided, with the arbitrary number of cells being regarded as a block. Therefore, for example, when a plurality of voltage sensors 51 included in monitoring unit 5 are integrated (packaged) as a monitoring IC for every prescribed number of voltage sensors 51, the DC/DC converter may be provided for each monitoring IC. Alternatively, each of DC/DC converters 41 to 43 may be, for example, a full bridge-type converter.

<Equalization Control>

During repeated charging and discharging of battery pack 2 configured as described above, voltage variations may occur among blocks 21 to 23. For each of blocks 21 to 23, ECU 10, for example, calculates a minimum voltage of voltages of the plurality of cells included in each block. Then, ECU 10 compares the minimum voltages of the cells in blocks 21 to 23, and determines that the voltage variations occur when a voltage difference is greater than a threshold value.

In the present embodiment, when ECU 10 determines that the voltage variations occur as described above, ECU 10 controls equalization unit 4 to execute equalization control. As described below, the equalization control refers to control for reducing (decreasing) the voltage difference (difference among the minimum voltages) among blocks 21 to 23 by controlling the DC/DC converter corresponding to at least one block of the plurality of blocks 21 to 23 such that electric power is received and transmitted between the above-described at least one block and auxiliary battery 3.

Vehicle 100 can take a ReadyON state in which vehicle 100 is in a traveling-possible state, and a ReadyOFF state in which vehicle 100 is in a traveling-impossible state. More specifically, in the ReadyOFF state, SMR 61 is in a non-conducting state. Therefore, electric power is not supplied from battery pack 2 to PCU 62. Therefore, electric power is not supplied to motor generator 63, and thus, engine 65 cannot be started. Motor generators 63 and 64 cannot be driven, either, to perform EV traveling.

Although not shown, when the user pushes a power switch while pressing a brake pedal in a case where vehicle 100 is in the ReadyOFF state and a shift range is a P (parking) range, vehicle 100 shifts from the ReadyOFF state to the ReadyON state. In the ReadyON state, SMR 61 is in a conducting state, and thus, electric power can be supplied from battery pack 2 to PCU 62. Therefore, engine 65 can be started using motor generator 63 to perform traveling using the motive power of engine 65, and motor generators 63 and 64 can be driven to perform EV traveling.

In the present embodiment, different equalization controls are executed when vehicle 100 is in the ReadyON state and when vehicle 100 is in the ReadyOFF state. Hereinafter, these controls will be referred to as "first equalization control" and "second equalization control".

Figure 4:
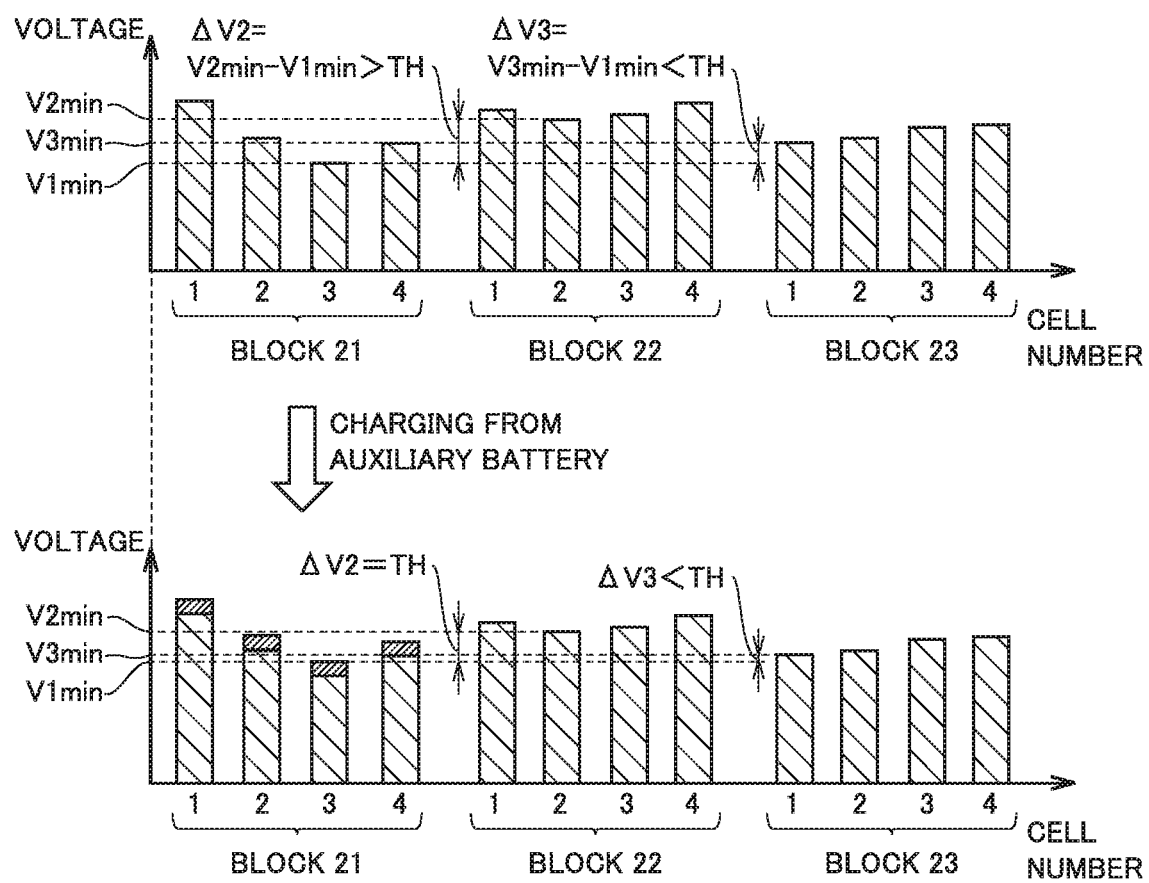
FIG. 4 is a conceptual diagram for illustrating equalization control (first equalization control) executed when the vehicle is in a ReadyON state.

FIG. 4 is a conceptual diagram for illustrating the first equalization control executed when vehicle 100 is in the ReadyON state. Hereinafter, in order to avoid complication of the description, a configuration in which four cells are included in each of three blocks 21 to 23 will be described by way of example. These four cells are denoted as a first cell, a second cell, a third cell, and a fourth cell from a positive electrode toward a negative electrode of each of blocks 21 to 23, so as to be distinguished from each other. Actually, each of blocks 21 to 23 may include a larger number of (e.g., a dozen or so to several tens of) cells.

Referring to FIG. 4, in this example, a voltage of the third cell, of the four cells included in block 21, is the lowest. This voltage is denoted as "block minimum voltage V1min". Similarly, in block 22, a voltage of the second cell is the lowest and is denoted as "block minimum voltage V2min". In block 23, a voltage of the first cell is the lowest and is denoted as "block minimum voltage V3min".

In the first equalization control, the minimum voltages (block minimum voltages) V1min, V2min and V3min of blocks 21 to 23 are compared, and the lowest voltage is calculated. That is, the lowest voltage in battery pack 2 is calculated. This voltage is denoted as "pack minimum voltage MIN" (refer to the following equation (1)).

$$\text{MIN} = \min\{V1\text{min}, V2\text{min}, V3\text{min}\} \quad (1)$$

Furthermore, a voltage difference $\Delta Vk$ between MIN and each of two block minimum voltages V1min, V2min, and V3min other than the block minimum voltage corresponding to pack minimum voltage MIN is calculated (refer to the following equation (2)). k represents any one block number of 1 to 3 other than a block number having MIN.

$$\Delta Vk = Vk\text{min} - \text{MIN} \quad (2)$$

In the example shown in FIG. 4, V1min, of three block minimum voltages V1min, V2min and V3min, is the lowest, and thus, pack minimum voltage MIN=V1min. In addition, voltage difference $\Delta V2 = V2\text{min} - \text{MIN}$ and voltage difference $\Delta V3 = V3\text{min} - \text{MIN}$. These voltage differences $\Delta V2$ and $\Delta V3$ are compared with a prescribed threshold value TH. In the example shown in FIG. 4, $\Delta V2 > \text{TH}$, whereas $\Delta V3 < \text{TH}$.

In the first equalization control, ECU 10 controls DC/DC converter 41 provided to correspond to block 21 having the lowest block minimum voltage, to thereby discharge auxiliary battery 3 and charge block 21 with electric power discharged from auxiliary battery 3. In this example, block 21 is charged until voltage difference $\Delta V2$ becomes equal to threshold value TH. As a result, block voltage V1min (=minimum voltage MIN) rises, and thus, voltage difference $\Delta V2$ (=V2min−MIN) is reduced. That is, the voltage difference between block 21 and block 22 is reduced and voltage equalization among blocks 21 to 23 is achieved.

Figure 5:
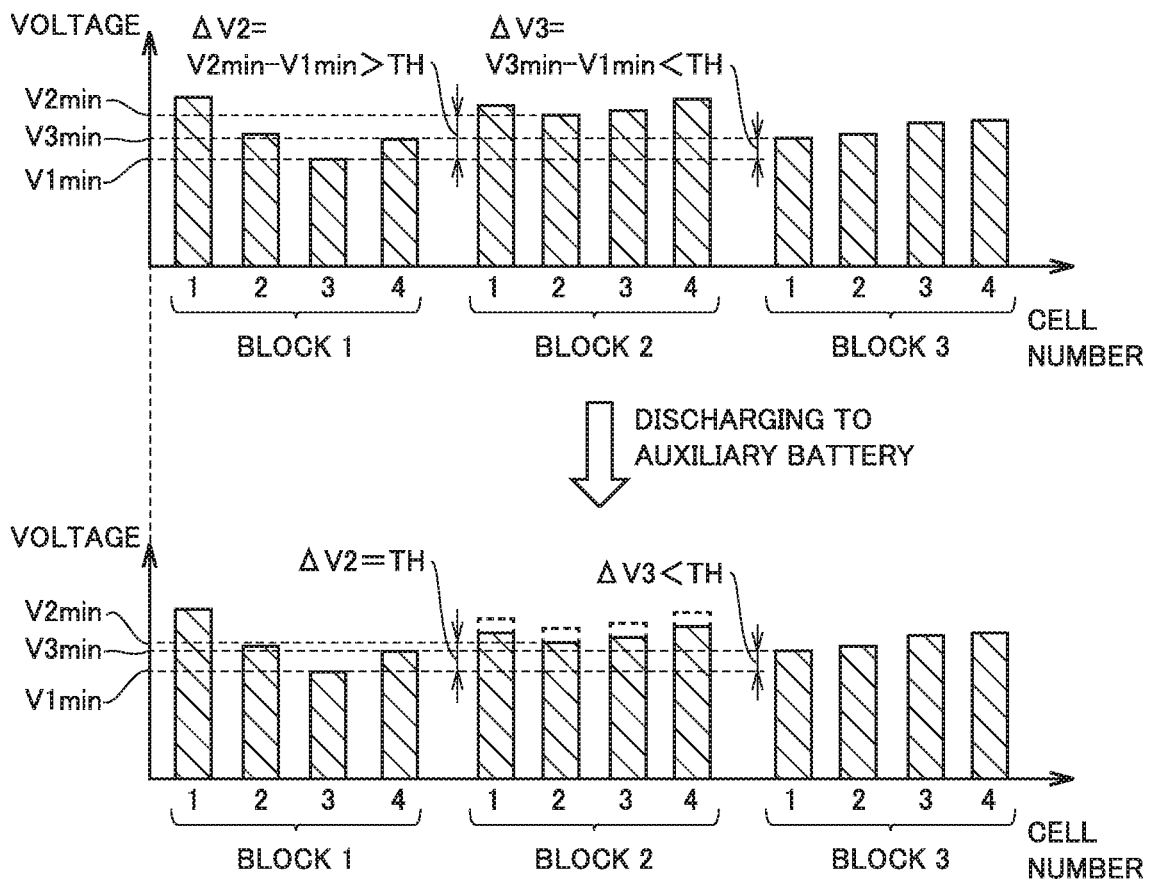
FIG. 5 is a conceptual diagram for illustrating equalization control (second equalization control) executed when the vehicle is in a ReadyOFF state.

FIG. 5 is a conceptual diagram for illustrating the second equalization control executed when vehicle 100 is in the ReadyOFF state. Referring to FIG. 5, in the second equalization control as well, three block minimum voltages V1min, V2min and V3min are calculated, and further, pack minimum voltage MIN is calculated, similarly to the first equalization control.

In the example shown in FIG. 5 as well, V1min, of three block minimum voltages V1min, V2min and V3min, is the lowest and pack minimum voltage MIN=V1min, similarly to the example shown in FIG. 4. In addition, voltage difference $\Delta V2$ (=V2min−MIN)>TH, whereas voltage difference $\Delta V3$ (=V3min−MIN)<TH.

In the second equalization control, ECU 10 controls DC/DC converter 42 provided to correspond to block 22 having voltage difference $\Delta V2$ exceeding threshold value TH, to thereby discharge block 22 and charge auxiliary battery 3 with electric power discharged from block 22. In this example, block 22 is discharged until voltage difference $\Delta V2$ becomes equal to threshold value TH. As a result, block voltage V2min decreases, and thus, voltage difference $\Delta V2$ (=V2min−MIN) is reduced. That is, the voltage difference between block 22 and block 21 is reduced and voltage equalization among blocks 21 to 23 is achieved.

As described above, when vehicle 100 is in the ReadyON state, the first equalization control is executed. In this control, when voltage difference $\Delta Vk$ between pack minimum voltage MIN and block minimum voltage Vkmin exceeds threshold value TH (i.e., when the voltage variations occur), block 21 including the cell indicating pack minimum voltage MIN is charged with the electric power supplied from auxiliary battery 3. As a result, voltage equalization among blocks 21 to 23 is achieved.

In contrast, when vehicle 100 is in the ReadyOFF state, the second equalization control is executed. In this control, when voltage difference $\Delta Vk$ exceeds threshold value TH, i.e., when the voltage variations occur, auxiliary battery 3 is charged with the electric power supplied from the block having voltage difference $\Delta V2$ exceeding threshold value TH. As a result, voltage equalization among blocks 21 to 23 is achieved again.

Furthermore, when vehicle 100 is in the ReadyOFF state for a long period of time, self-discharge of auxiliary battery 3 progresses gradually and the electric power stored in auxiliary battery 3 may decrease excessively. As a result, the important functions (e.g., a function of a security system placed in vehicle 100) implemented by consuming the electric power of auxiliary battery 3 cannot possibly be maintained. Since auxiliary battery 3 is charged by executing the second equalization control, the occurrence of such a situation can be reduced.

<Control Flow>

Figure 6:
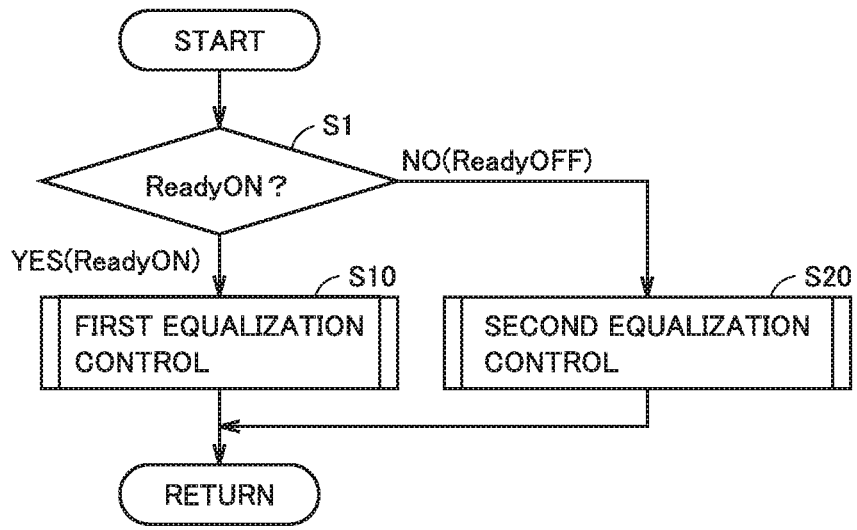
FIG. 6 is a flowchart showing the equalization controls in the present embodiment.

FIG. 6 is a flowchart showing the equalization controls in the present embodiment. The process shown in this flowchart is invoked from a main routine (not shown) by ECU 10 at every prescribed calculation cycle and repeatedly performed, for example. Each step (abbreviated as "S") included in the flowcharts shown in FIG. 6 and FIGS. 7 and 8 described below is basically implemented by software processing by ECU 10. However, a part or all of each step may be implemented by hardware (electric circuit) fabricated in ECU 10.

Referring to FIG. 6, in S1, ECU 10 determines whether or not vehicle 100 is in the ReadyON state. As described above, for example, when the user pushes the power switch while pressing the brake pedal in a case where the shift range (not shown) of vehicle 100 is the P range, vehicle 100 enters the ReadyON state.

When vehicle 100 is in the ReadyON state (YES in S1), ECU 10 moves the process to S10 and executes the first equalization control. In contrast, when vehicle 100 is in the ReadyOFF state (NO in S1), ECU 10 moves the process to S20 and executes the second equalization control.

Figure 7:
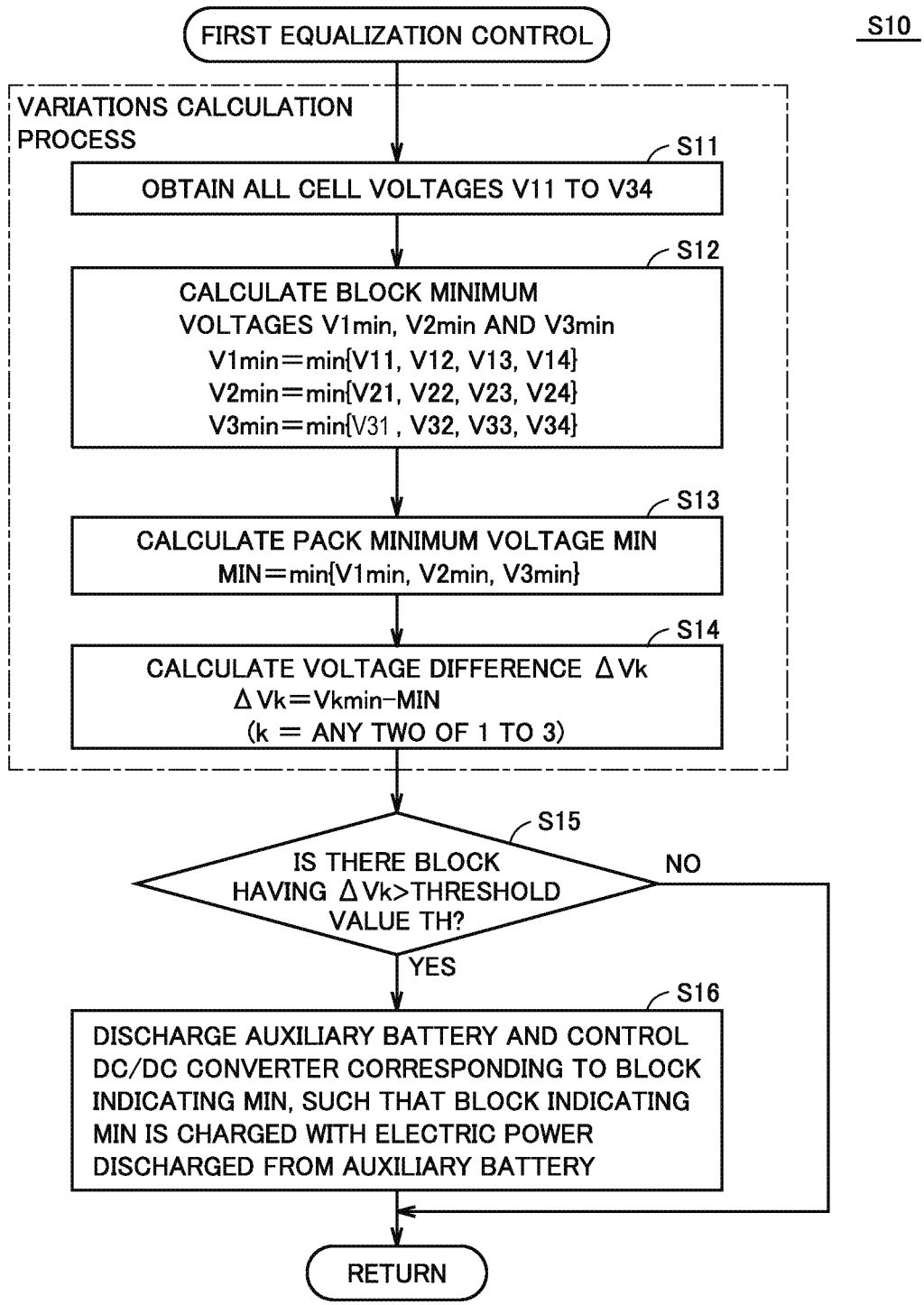
FIG. 7 is a flowchart showing the first equalization control.

FIG. 7 is a flowchart showing the first equalization control (process in S10). Referring to FIG. 7, a process in S11 to S14 is a process (variations calculation process) for calculating voltage variations among blocks 21 to 23.

In S11, ECU 10 obtains the voltages of all cells included in blocks 21 to 23 from voltage sensor 51. A voltage of a j-th (j=1 to 4) cell included in a block $2i$ (i=1, 2, 3) in the example shown in FIGS. 4 and 5 is denoted as Vij. ECU 10 obtains voltages V11 to V34.

In S12, ECU 10 calculates a block minimum voltage Vimin for each of blocks 21 to 23. Specifically, ECU 10 calculates a minimum voltage of voltages V11 to V14 of the four cells included in block 21, and determines this voltage as block minimum voltage V1min (V1min=min{V11, V12, V13, V14}). Similarly, for remaining two blocks 22 and 23, ECU 10 calculates block minimum voltages V2min and V3min.

In S13, ECU 10 calculates, as pack minimum voltage MIN, the lowest voltage of block minimum voltages V1min, V2min and V3min calculated in S12 (refer to the above-described equation (1)).

In S14, ECU 10 calculates voltage difference ΔVk between minimum voltage MIN and each of the block minimum voltages of the two blocks other than the block including the cell indicating minimum voltage MIN (refer to the above-described equation (2)).

In S15, ECU 10 determines whether or not there is a block in which voltage difference ΔVk calculated in S14 exceeds threshold value TH. Threshold value TH is predetermined as a value at which it is desirable to reduce voltage variations (in other words, a value at which it is desirable to avoid the occurrence of further voltage variations), in accordance with the specifications of battery pack 2 and the like.

When there is at least one block having voltage difference ΔVk greater than threshold value TH (YES in S15), ECU 10 determines that voltage variations to be reduced occur, and operates the DC/DC converter corresponding to the block including the cell indicating pack minimum voltage MIN, such that the block is charged with the electric power discharged from auxiliary battery 3 (S16). Charging of the block described above may be continued until voltage difference ΔVk becomes equal to threshold value TH as described with reference to FIG. 4, or may be stopped when a predetermined amount of electric power is charged. Although the example of operating only one DC/DC converter has been described with reference to FIG. 4, two DC/DC converters may be operated.

In contrast, when all voltage differences ΔVk are smaller than threshold value TH (NO in S15), ECU 10 returns the process to the main routine without performing the process in S16.

FIG. 8 is a flowchart showing the second equalization control (process in S20). Referring to FIG. 8, the variations calculation process in S21 to S24 is equal to the variations calculation process (process in S11 to S13 in FIG. 7) in the first equalization control, and thus, detailed description will not be repeated.

In S25, ECU 10 determines whether or not there is a block in which voltage difference ΔVk calculated in S14 exceeds threshold value TH. This threshold value TH corresponds to "second threshold value" according to the present disclosure. In the present embodiment, this threshold value TH is the same as the threshold value ("first threshold value" according to the present disclosure) in the first equalization control. However, this threshold value TH may be different from the threshold value in the first equalization control.

When there is at least one block having voltage difference ΔVk greater than threshold value TH (YES in S25), ECU 10 determines that voltage variations occur, and operates the DC/DC converter corresponding to the block having the higher block minimum voltage, of a pair of blocks having voltage difference ΔVk greater than threshold value TH, such that auxiliary battery 3 is charged with the electric power discharged from the block (S26).

Although not shown, a condition that an SOC (State Of Charge) of auxiliary battery 3 falls below a prescribed value may be included as a condition for charging auxiliary battery 3 in the second equalization control (condition for performing the process in S26 described below). The SOC of auxiliary battery 3 can be calculated by detecting a voltage (OCV: Open Circuit Voltage) of auxiliary battery 3 using voltage sensor 31, and referring to an SOC-OCV curve. Charging of auxiliary battery 3 may be continued until voltage difference ΔVk becomes equal to threshold value TH, or may be continued until the SOC of auxiliary battery 3 exceeds a prescribed reference value. Alternatively, charging of auxiliary battery 3 may be stopped when a predetermined amount of electric power is charged. In the second equalization control as well, the number of the DC/DC converter to be operated is not limited to one, and two DC/DC converters may be operated.

When all voltage differences ΔVk are smaller than threshold value TH (NO in S25), ECU 10 returns the process to the main routine without performing the process in S26.

As described above, according to the present embodiment, DC/DC converters 41 to 43 are placed between battery pack 2 and auxiliary battery 3 instead of an equalization circuit (passive-type equalization circuit) including a resistor, and thus, generation of heat in the first and second equalization controls can be reduced and the electric power can be effectively utilized. In addition, when vehicle 100 is in the ReadyOFF state, the second equalization control is executed, and auxiliary battery 3 is thereby charged. As a result, the electric power required for the auxiliary device can be supplied for a long period of time and the function of the auxiliary device can be maintained.

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A battery system mountable on an electrically-powered vehicle including an auxiliary device and a motor serving as a driving source, the battery system comprising:
   an auxiliary battery that supplies an electric power to the auxiliary device;
   an assembled battery that supplies an electric power to the motor, the assembled battery including a plurality of blocks connected in series, each block of the plurality of blocks including a plurality of cells connected in series;
   a plurality of converters wherein each converter converts electric power between a corresponding block of the plurality of blocks and the auxiliary battery, the plurality of converters being respectively provided to correspondent blocks of the plurality of blocks; and
   a controller that executes a first equalization control when the electrically-powered vehicle is in a traveling-possible state, and executes a second equalization control when the electrically-powered vehicle is in a traveling-impossible state,
   the first equalization control being a control for, when voltage variations among the plurality of blocks exceed a first threshold value, operating a converter of the plurality of converters converts corresponding to a lower-voltage block, of at least one pair of blocks of the plurality of blocks having the voltage variations exceeding the first threshold value, such that the lower-voltage block is charged with an electric power supplied from the auxiliary battery,
   the second equalization control being a control for, when the voltage variations among the plurality of blocks exceed a second threshold value, operating a converter of the plurality of converters converts corresponding to a higher-voltage block, of at least one pair of blocks of the plurality of blocks having the voltage variations exceeding the second threshold value, such that the auxiliary battery is charged with an electric power supplied from the higher-voltage block.

2. An electrically-powered vehicle comprising:
   the battery system as recited in claim 1;
   the motor; and
   the auxiliary device.

3. A control method for an electrically-powered vehicle including an assembled battery that supplies an electric power to a motor serving as a driving source, and an auxiliary battery that supplies an electric power to an auxiliary device, the assembled battery including a plurality of blocks connected in series, each block of the plurality of blocks including a plurality of cells connected in series,
   the electrically-powered vehicle further including a plurality of converters wherein each converter converts electric power between a corresponding block of the plurality of blocks and the auxiliary battery, the plurality of converters being respectively provided to correspondent blocks of the plurality of blocks,
   the control method comprising:
   executing a first equalization control when the electrically-powered vehicle is in a traveling-possible state; and
   executing a second equalization control when the electrically-powered vehicle is in a traveling-impossible state,
   the first equalization control being a control for, when voltage variations among the plurality of blocks exceed a first threshold value, operating a converter of the plurality of converters converts corresponding to a lower-voltage block, of at least one pair of blocks of the plurality of blocks having the voltage variations exceeding the first threshold value, such that the lower-voltage block is charged with an electric power supplied from the auxiliary battery,
   the second equalization control being a control for, when the voltage variations among the plurality of blocks exceed a second threshold value, operating a converter of the plurality of converters converts corresponding to a higher-voltage block, of at least one pair of blocks of the plurality of blocks having the voltage variations exceeding the second threshold value, such that the auxiliary battery is charged with an electric power supplied from the higher-voltage block.

* * * * *